Patented July 16, 1940

2,208,253

UNITED STATES PATENT OFFICE

2,208,253

INSECTICIDAL AND FUNGICIDAL COMPOSITION

Albert L. Flenner, Robert B. Flint, and Frank H. Kaufert, Wilmington, Del., and Louis Spiegler, Woodbury, N. J., assignors to E. I. du Pont de Nemours & Company, Wilmington, Del., a corporation of Delaware No Drawing. Application October 13, 1938, Serial No. 234,778

12 Claims. (Cl. 167—22)

This invention relates to pest-control compositions useful as fungicides, insecticides, and disinfectants, and has for its general object the provision of new and useful compositions having the power of killing, repelling, or inhibiting the development of economically harmful pests, such as insects, fungi, and bacteria, which prey on plant and animal matter either in its natural or fabricated state. More particularly this invention relates to pest-control compositions which contain as an active ingredient one or more organo-copper complexes characterized by a chelate ring structure of the type shown below.

Specifically this invention relates to compositions useful in controlling one or more types of economically harmful pests, such as insects, fungi, bacteria, and like organisms, which compositions contain one or more chelate cupric enolates of an aliphatic ketone in which the keto carbon is separated from a second carbonyl carbon by a single intermediate carbon atom to which is attached at least one hydrogen atom. These compounds are characterized by a stable spirane structure consisting of two six-membered type B chelate rings (Gilman, "Organic Chemistry," vol. II, p. 1648, John Wiley & Sons, New York, 1936), each of which contains two conjugated double bonds and one coordinate link, and in which copper acts as the acceptor center and keto-oxygen as the donor atom. The great majority of these compounds may be represented as having the following structure:

I. 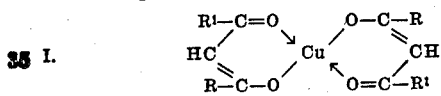

in which R and R$^1$ are monovalent radicals attached to the two carbonyl groups of the ketone as above defined. R, for example, is alkyl, and R$^1$ is alkyl or alkoxy. Preferably both R and R$^1$ are alkyl, and within this subgenus, the most effective compounds are those in which R and R$^1$ have together less than 6 carbons, R$^1$ preferably being the methyl radical. In isolated instances, the methenyl hydrogen may be absent and the fourth valence of the methenyl carbon joined to R.

The chelate cupric enolates are complex copper derivatives of the enol form of ketones in which the keto carbon is preferably separated by a methylene group from a second carbonyl carbon. Ketones of this type may be characterized by the dynamic equilibrium $$R^1CO \cdot CH_2 \cdot CO \cdot R \rightleftarrows R^1CO \cdot CH:C(OH)R$$

the enol form of which is readily identifiable in the structural formula given above. Cupric copper reacts readily with the enol form to give the corresponding chelate cupric enolate, the reaction going to completion as the enol form becomes stabilized in the chelate ring structure. Such ketones are either aliphatic beta-diketones or beta-keto esters.

The chelate cupric enolates are not to be confused with cupric salts but have properties differing widely from those of such salts. In general, the chelate cupric enolates are characterized by greater solubility in solvents such as benzene, chloroform, and aliphatic hydrocarbons than are copper salts. They are insoluble in water, and are almost non-conductors of electricity. They either do not answer the ordinary tests for copper or else react very slowly. Some of them may be distilled without appreciable decomposition. In these and many other respects, the chelate cupric enolates are distinctly different from cupric salts.

We have found that the chelate cupric enolates provide effective means for controlling a wide variety of pests preying on plant and animal matter either in its natural or fabricated state and are particularly useful in controlling and preventing the development of fungi and similar micro-organisms. Our investigations have shown that the chelate cupric enolates as a class have properties toxic to one or more types of pests which commonly infest plant or animal matter either in its natural or fabricated state. We have found, for example, that the chelate cupric enolates are highly effective fungicides, in many instances being more than ten times as effective as the copper fungicides heretofore available. Moreover, we have discovered the surprising fact that the chelate cupric enolates have insecticidal properties, in many cases being comparable with such highly effective insecticides as lead arsenate and calcium arsenate.

The biological properties of the chelate cupric enolates vary widely with the individual members of the class, many of them being markedly toxic to fungi and insects and others being only moderately effective. Those which we have found outstanding are derived from aliphatic beta-diketones which contain less than 9 carbon atoms. We have found that compounds falling within this classification, including such compounds as the chelate cupric enolates of 2,4-hexanedione, 6-methyl-2,4-heptanedione, and dehydroacetic acid, are consistently outstanding in regard to their high toxicity and general applicability to the control of such diverse pests as fungi and insects.

A particular advantage for the use of chelate cupric enolates in pest control lies in the fact that they may be readily and economically synthesized from relatively inexpensive materials by known methods. See, for example, Houben-Weyl "Die Methoden der Organischen Chemie", vol. II, pp. 588-591. For example, the chelate cupric enolates of 2,4-diketones may be synthesized from acetone, monohydric alcohol esters of monocarboxylic acids, such as ethyl acetate, and a cupric salt. Thus acetone and an ester of the type $RCOOC_2H_5$ in which R is an alkyl radical may be condensed according to the Claisen condensation reaction as follows:

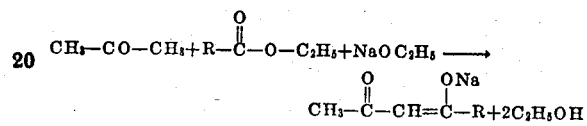

The sodium enolate of 2,4-pentanedione thus obtained reacts readily with a cupric salt, such as cupric sulfate, to form the corresponding chelate cupric enolate, thusly,

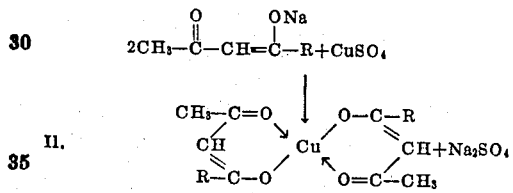

The chelate cupric enolates of beta-diketones are in general readily prepared by mixing the diketone or a solution of its alkali metal enolate with a solution of a cupric salt. For example, an 88 per cent yield of pure chelate cupric enolate of 2,4-pentanedione was obtained by adding a solution of 25 parts of pure hydrated cupric sulfate in 150 parts of water to a mixture of 21 parts of 2,4-pentanedione and a solution of 8 parts of sodium hydroxide in 100 parts of water at a temperature of 35° C. After standing 20 minutes, 10 parts of concentrated ammonium hydroxide solution was added to dissolve any cupric hydroxide and the blue precipitate filtered off, washed with water and dried. As a further example, 20 parts of 2,4-pentanedione was added with good stirring to a solution of ammoniacal cupric sulfate prepared by mixing 25.6 parts of concentrated ammonium hydroxide (specific gravity 0.90) with a solution of 25 parts of hydrated cupric sulfate in 150 parts of water. Precipitated chelate cupric enolate of 2,4-pentanedione was obtained in 84 per cent yield.

The chelate cupric enolate of dehydroacetic acid, which has the formula

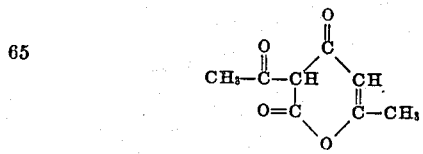

is prepared as follows: Two hundred fifty cubic centimeters of a 15 per cent water solution of hydrated cupric sulfate is slowly added at room temperature with stirring to 50 cc. of a water suspension containing 25.2 grams of dehydroacetic acid and 15 cc. of concentrated ammonium hydroxide. A light lavender precipitate separated out. This precipitate was filtered, washed with cold water and then with several small portions of methyl alcohol. A final wash with ether was used to remove traces of unreacted dehydroacetic acid. After air drying the grayish white powder weighed 29 grams.

Other methyl ketones, among them methyl isobutyl ketone, methyl ethyl ketone, and mesityl oxide, may be used instead of acetone in the above reaction. Similarly, other aliphatic monohydric alcohol esters of fatty acids, e. g., methyl acetate, methyl propionate, methyl isobutyrate, ethyl caprylate, and butyl butyrate, may be used instead of ethyl acetate. Other well known methods for preparing diketones, such as the self-condensation of acetic anhydride with boron trifluoride catalyst, may be used. Beta-keto esters are likewise obtainable by well known processes. Regardless of how obtained the beta-diketone or beta-keto ester may be converted in the manner indicated above to a chelate cupric enolate.

From the standpoint of biological efficiency, the chelate cupric enolates of the aliphatic 2,4-diketones containing less than 9 carbon atoms are the most effective and, as a rule, most economical. Thus we have observed outstanding toxic properties in chelate cupric enolates having the structure given in Formula II above in which R is an alkyl radical having less than 5 carbon atoms (e. g., methyl, ethyl, isobutenyl, and isobutyl), as compared with various copper compounds now in common use as fungicides. Moreover, these particular chelate cupric enolates are substantially more effective than the higher members of the series wherein R is amyl, undecyl, and like radicals containing more than 4 carbon atoms. We do not mean to imply that the latter compounds are not effective biologically but wish merely to emphasize the outstanding biological properties of the lower members of the chelate cupric enolate series. The latter are not only remarkably effective as fungicides but, moreover, they are outstanding in that they possess high insecticidal and bactericidal efficiency. The organic coppers heretofore available are notably lacking in these properties. With the exception of Paris green and its homologues, which are more properly considered as arsenicals and are thus subject to the well-known disadvantages of arsenic-containing compounds, we are not aware of any organic coppers having any practical value as insecticides.

In applying the compositions of this invention to pest control the chelate cupric enolates may be dispersed in any suitable medium, such as inert powders, non-solvent liquids, or solvents, and when so dispersed may be used for dusting or spraying plant foliage, impregnating fibrous materials, for disinfecting materials subject to attack of micro-organisms, and in many similar environments where insecticides, fungicides, bactericides, and disinfectants are commonly employed. In many applications it may be desirable to include suitable spreading and dispersing agents, suitable adhesives, sticking agents and fixatives, and other materials useful in promoting the effectiveness for the particular purpose in mind. Likewise, they may be used in combination with other toxic materials whenever required to obtain maximum effectiveness in the simultaneous control of several pests. The latter, however, will not, as a rule, be found necessary, particularly with the lower members of the chelate cupric enolate series, which exhibit uniformly high toxicity to a wide variety of fungi and at the same time possess insecticidal properties.

Chelate cupric enolates were found to be effective against such diverse test fungi as *Fomes annosus* (wood rotter), *Penicillium digitatum* (cause of mold of citrous fruit), *Aspergillus niger* (general saprophyte), *Penicillium sp.* (lumber blue molds), *Ceratostomella pilifera* (lumber blue stainer), *Cladosporium fulvum* (cause of tomato leaf mold), and *Sclerotinia fructicola* (cause of brown rot of fruits).

The tests were made by dispersing the compounds of the above examples in nutrient agars which were favorable to the growth of the test fungi. The liquid agar containing the suspended compounds was then poured into sterile petri plates and when cool inoculated with spores or bits of mycelium of the above fungi. The effective concentrations are those completely inhibiting all growth of fungous mycelium and spore germination.

The effectiveness of these compound may be best judged by comparing them with some of the common inorganic and organic coppers. The results of such a test series is summarized in the following table:

TABLE I

*Toxicity to fungi of chelate cupric enolates as compared to several copper salts commonly used as fungicides*

| Compound | Concentration in per cent of fungicides in agar inhibiting all growth of fungi* | | | | | | |
|---|---|---|---|---|---|---|---|
| | A | B | C | D | E | F | G |
| Chelate cupric enolate of 2,4-pentanedione | .025 | .025 | .025 | .012 | .01 | .01 | .025 |
| Chelate cupric enolate of 2,4-hexanedione | .025 | .025 | .025 | .012 | .01 | .01 | .025 |
| Chelate cupric enolate of ethyl acetoacetate | | .1 | .1 | | | | .05 |
| Chelate cupric enolate of 6-methyl-5-heptene-2,4-dione | .012 | .025 | .012 | .012 | .012 | .012 | .025 |
| Chelate cupric enolate of 6-methyl-2,4-heptanedione | .025 | .025 | .025 | .025 | .025 | .025 | .025 |
| *Comparative compounds* | | | | | | | |
| Copper sulphate | .2 | .5 | .5 | .5 | .2 | .1 | >.4 |
| Copper naphthenate | .4 | >.4 | >.4 | | | | >.4 |
| Copper resinate | .4 | >.4 | .8 | | | | >.4 |
| Copper borate | .4 | >.4 | .8 | | | | >.4 |

*A—*Fomes annosus* (Madison #517).
B—*Penicillium digitatum*.
C—*Penicillium sp*.
D—*Ceratostomella pilifera*.
E—*Cladosporium fulvum*.
F—*Sclerotinia fructicola*.
G—*Aspergillus niger*.
>—Greater than.

These tests are representative of standard technique for the comparative evaluation of fungicides and show the marked superiority of the chelate cupric enolates as compared with a number of copper compounds which are widely used as fungicides.

The same remarkable effectiveness has also been found when the chelate cupric enolates are applied to fungi in their natural habitat. For example, the chelate cupric enolates were found effectively to control tomato leaf mold caused by *Cladosporium fulvum*. The chelate cupric enolates of 2,4-hexanedione and 2,4-pentanedione were prepared as readily dispersible products by grinding with a like amount of bentonite. When these preparations were sprayed at dilutions of 1:200 and 1:400 on tomato plants grown in the greenhouse, tomato leaf mold was effectively controlled. The control afforded by these new compounds, as compared to the results obtained with several inorganic coppers in a typical greenhouse experiment, is shown in the following table:

TABLE II

*Control of tomato leaf mold*

| Compound | Concentration | Percent of leaves infected with leaf mold after 6 weeks |
|---|---|---|
| Chelate cupric enolate of 2,4-hexanedione | 1:200 | 1.4 |
| | 1:400 | 1.3 |
| Chelate cupric enolate of 2,4-pentanedione | 1:200 | .8 |
| | 1:400 | 2.7 |
| Red copper oxide | 1:100 | 4.0 |
| | 1:200 | 7.0 |
| Tribasic copper sulfate | 1:100 | 12.0 |
| | 1:200 | 25.0 |
| Control—no treatment | | 67.0 |

The same chelate cupric enolates were also found effective in controlling mildew on plants. Chelate cupric enolates of 2,4-hexanedione and 2,4-pentanedione were prepared as 50 per cent readily dispersible products by adding bentonite. These preparations were added to water to obtain concentrations of the active ingredient of 1:400 and 1:200 which were sprayed on various species of plants in the greenhouse, all of which were severely attacked by mildew (included were several genera and species belonging to the family Erysiphaceae.) Bordeaux mixture (3—3—50), basic copper sulphate 1:100, and red copper oxide 1:200 were sprayed on other plants for comparative purposes. The chelate cupric enolates of both 2,4-hexanedione and 2,4-pentanedione completely eliminated or burned out established mildew infections on beans, roses, cucumber, and calendula, and prevented establishment of new infections, whereas the inorganic coppers mentioned above were not effective in burning out established mildew infections and only moderately effective in preventing further infection.

Chelate cupric enolate of 2,4-pentanedione when used at 1:1000 and watered on the soil, at the rate of 1 pint per square foot, was found effectively to prevent damping-off of sage, petunia, torenia, and snap-dragon, giving better damping-off control and being less injurious to the above plants than red copper oxide at 1:300 and 1:600.

Several tests on cotton fabrics were also made to determine the effectiveness of the chelate cupric enolates as preservatives in comparison with several compounds now widely used and several recently recommended for the preservation of cellulosic materials. The fabrics were impregnated with acetone and alcohol solutions of the various chemicals, dried to remove all traces of the solvents, placed in humid chambers, and inoculated with spore suspensions of several fungi. The fungi used are known to be destructive to cellulosic fabrics and include such organisms as *Chaetomium globosum, Stachybotrys sp.*, several Aspergilli and Penicillia. In order to make the tests more severe the fabrics were kept moist with a mineral nutrient solution that is conducive to the growth of the above fungi. The results of a typical test taken after an inoculation period of two months are given in the following table:

TABLE III

| Compound | Concentration (based on dry weight of fabric) per cent | Amount of mold growth | Reduction in tensile strength after 2 mos. exposure, per cent |
|---|---|---|---|
| Chelate cupric enolate of 2,4-hexanedione. | .32 | None | 0 |
| | .16 | do | 0 |
| | .08 | do | 0 |
| Chelate cupric enolate of 6-methyl-5-heptene-2,4-dione. | .32 | do | 0 |
| | .16 | do | 0 |
| | .08 | do | 0 |
| Chelate cupric enolate of 6-methyl-2,4-heptanedione. | .32 | do | 0 |
| | .16 | do | 0 |
| | .08 | do | 0 |
| Pentachlorophenol | .32 | do | 0 |
| | .16 | Slight | 0-10 |
| | .08 | do | 50-75 |
| Salicylanilide | .32 | None | 0 |
| | .16 | do | 0 |
| | .08 | Medium | 25-50 |
| Beta-naphthol | .32 | None | 0 |
| | .16 | Medium | 50-75 |
| | .08 | Heavy | 75-100 |
| Phenol | .32 | Slight | 10-25 |
| | .16 | Heavy | 75-100 |
| | .08 | do | 75-100 |
| Copper naphthenate | .32 | Slight | 10-25 |
| | .16 | Medium | 50-75 |
| Control—untreated | .08 | Heavy | 75-100 |
| | | do | 95-100 |

Fabrics coated with nitrocellulose and other forms of regenerated cellulose are subject to attack by molds such as *Aspergillus niger*, *Chaetomium globosum*, and *Stachybotrys sp*. Such coated fabrics impregnated to the extent of .12 and .25 per cent of the solid content of such cellulosic materials with the chelate cupric enolate of 2,4-hexanedione, either from an acetone solution or by incorporating this material in the nitrocellulose dope applied to the fabric, are effectively protected from attack by the above fungi even though the treated materials are exposed under conditions very conducive to attack by molds.

Cellulose base lacquers or paints similarly subject to attack may be protected by incorporating a suitable quantity of a chelate cupric enolate of a beta-diketone. For example, the chelate cupric enolates of 2,4-pentanedione, 2,4-hexanedione, and 6-methyl-5-heptene-2,4-dione have been found effective in preventing development of mold in cellulose lacquers. The following table illustrates the effectiveness of these compounds as compared with a number of powerful fungicides known in the art:

TABLE IV

| Compound | Concentration | Amount of surface growth | Deeper discoloration of paint film |
|---|---|---|---|
| Chelate cupric enolate of 2,4-pentanedione. | 1:250 | None | None. |
| | 1:500 | Slight | Do. |
| | 1:1000 | Medium | Slight. |
| Chelate cupric enolate of 2,4-hexanedione. | 1:250 | None | None. |
| | 1:500 | do | Do. |
| | 1:1000 | Slight | Do. |
| Chelate cupric enolate of 6-methyl-5-heptene-2,4-dione. | 1:250 | None | Do. |
| | 1:500 | do | Do. |
| | 1:1000 | Slight | Do. |
| Beta-naphthol | 1:250 | Heavy | Very severe. |
| Salicylanilide | 1:250 | Medium | Medium. |
| Pentachlorophenol | 1:250 | Heavy | Very severe. |
| Thymol | 1:250 | do | Do. |
| 8-hydroxyquinoline | 1:250 | Slight | Slight. |

The chelate cupric enolates likewise afford protection against other types of micro-organisms. For example, .05 per cent of the chelate cupric enolate of 2,4-hexanedione in a 10 per cent animal glue was found effectively to prevent bacterial decomposition.

Insecticide evaluations by the standard cage method were also carried out on bean plants infested with the Mexican bean beetle. The results obtained are illustrated in the following table:

TABLE V

| Compound | Concentration | Percent kill | Percent killed by control |
|---|---|---|---|
| Chelate cupric enolate of 2,4-pentanedione. | 0.5% in water (spray). | 50 | 50 (lead arsenate). |
| Chelate cupric enolate of 2,4-hexanedione. | 10% in talc (dust). | 70 | 70 (lead arsenate). |
| Chelate cupric enolate of 6-methyl-5-heptene-2,4-dione. | 1.5% in water (spray). | 30 | 62 (lead arsenate). |
| Chelate cupric enolate of 6-methyl-2,4-heptanedione. | do | 32 | 36 (calcium arsenate). |
| Chelate cupric enolate of dehydroacetic acid. | do | 80 | 100 (calcium arsenate). |

With all compounds very little feeding was observed, and no injury to the plants resulted. In all cases, including the controls, not more than about 5 per cent of the foliage was eaten, whereas in untreated plants the foliage was entirely consumed. With the last compound not more than one per cent of the foliage was eaten. The first two compounds so closely paralleled the lead arsenate control that no difference could be observed, whereas the third and the last two compounds were somewhat less effective than lead arsenate and calcium arsenate, respectively, if the number of beetles killed alone be considered. If, however, the amount of feeding, which is the really significant factor, is considered, it will be apparent that the relative efficiencies are practically the same in all cases. Thus, in the present chelate cupric enolates, is provided a group of agents which, while having the same practical effectiveness as lead and calcium arsenates, do not leave on the plant or foliage the highly objectionable lead and arsenic residues.

While we have chosen to illustrate our invention with respect to the chelate cupric enolates which we have found most effective for controlling fungi and insects, it is to be understood that our invention in its broader aspects is in no wise limited to these particular compounds. We conceive our invention as broadly directed to pest-control compositions containing as an active ingredient one or more organo-copper complexes characterized by a chelate ring structure, as hereinbefore exemplified, but, for the reasons already pointed out, we are particularly concerned with chelate cupric enolates of the aliphatic 2,4-diketones having less than 9 carbon atoms. It is to be understood, however, particularly since many apparently widely differing embodiments of our invention may be made, that such variations as come within the spirit thereof are intended to be included within the scope of the appended claims.

We claim:

1. A pest-control composition, useful for controlling fungi, insects, bacteria, and like organisms, which contains as an active ingredient a chelate cupric enolate.

2. A pest-control composition, useful for controlling fungi, insects, bacteria, and like organisms, which contains as an active ingredient a chelate cupric enolate of an aliphatic ketone in which the keto carbon is separated from a second carbonyl carbon by one and only one carbon atom to which is attached at least one hydrogen atom.

3. A pest-control composition, useful for controlling fungi, insects, bacteria, and like organisms, which contains as an active ingredient a chelate cupric enolate of an aliphatic ketone in which the keto carbon is separated from a second carbonyl carbon by a single methylene group.

4. A pest-control composition, useful for controlling fungi, insects, bacteria, and like organisms, containing as an active ingredient an organo-copper complex having the following structure

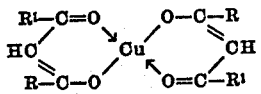

in which R and $R^1$ are the monovalent radicals attached to the two carbonyl groups of an aliphatic ketone in which the keto carbon is separated from a second carbonyl carbon by a single methylene group.

5. A pest-control composition according to claim 4, R and $R^1$ being alkyl radicals.

6. A pest-control composition according to claim 4, R and $R^1$ being alkyl radicals having together less than 6 carbon atoms.

7. A pest-control composition, useful for controlling fungi, insects, bacteria, and similar organisms, containing as an active ingredient a chelate cupric enolate of an aliphatic 2,4-diketone having less than 9 carbon atoms.

8. A pest-control composition, useful for controlling fungi, insects, bacteria, and like organisms, containing as an active ingredient a chelate cupric enolate of 2,4-hexanedione.

9. A pest control composition useful for controlling fungi, insects, bacteria, and like organisms, which contains as an active ingredient a cupric chelate compound characterized by a spirane structure of two 6-membered rings each of which contains an enol oxygen member, a keto oxygen member, a double bond conjugated with the keto linkage, and a copper member which is shared by both rings through covalent links with the enol oxygens and through coordinate links with the keto oxygens.

10. A pest-control composition useful for controlling fungi, insects, bacteria and like organisms, containing as an active ingredient the chelate cupric enolate of 2,4-pentanedione.

11. A pest-control composition useful for controlling fungi, insects, bacteria and like organisms, containing as an active ingredient a chelate cupric enolate of a beta-ketoester of a carboxylic acid.

12. A pest-control composition useful for controlling fungi, insects, bacteria and like organisms, containing as an active ingredient a chelate cupric enolate of dehydroacetic acid.

ALBERT L. FLENNER.
ROBERT B. FLINT.
FRANK H. KAUFERT.
LOUIS SPIEGLER.